United States Patent
Schacht et al.

(10) Patent No.: US 7,693,529 B2
(45) Date of Patent: Apr. 6, 2010

(54) METHOD OF SCHEDULING FOR MOBILE STATIONS IN WIRELESS COMMUNICATION NETWORKS

(75) Inventors: Mirko Schacht, Nuremberg (DE); Peter Jung, Duisburg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 704 days.

(21) Appl. No.: 10/887,291

(22) Filed: Jul. 9, 2004

(65) Prior Publication Data
US 2006/0009244 A1    Jan. 12, 2006

(51) Int. Cl.
*H04B 7/00* (2006.01)
(52) U.S. Cl. ............ 455/500; 455/561; 455/562.1
(58) Field of Classification Search ......... 455/500, 455/447
See application file for complete search history.

(56) References Cited

U.S. PATENT DOCUMENTS 5,898,681 A * 4/1999 Dutta .................. 370/229
2002/0098873 A1 * 7/2002 Alexiou ................ 455/562
2002/0137518 A1 * 9/2002 Achour ................ 455/447
2004/0052237 A1   3/2004 Schiff ................... 370/345
2004/0204098 A1 * 10/2004 Owen ................... 455/561
2004/0204108 A1 * 10/2004 Etkin et al. .......... 455/562.1
2008/0064410 A1 * 3/2008 Kwon et al. .......... 455/452.2

OTHER PUBLICATIONS

European Search Report dated Aug. 26, 2005.
Yonghe Liu, et al., "WCFQ: An Opportunistic Wireless Scheduler With Statistical Fairness Bounds", IEE Transactions on Wireless Communication, vol. 2, No. 5, Sep. 2003, pp. 1017-1028.
Mirko Schacht, et al., "System Capacity from UMTS Smart Antenna Concepts", IEEE 2003, pp. 3126-3130.
Mirko Schacht, et al., Technical Memorandum "Comparison of adaptive beam froming and fixed beam switching in consideration of P-CPICH and S-CPICH for downlink transmission", Mar. 6, 2002, pp. 1-13.
Keith Conner, et al., Technical Memorandum "Intelligent Antenna Solutions for 3G CDMA Communications-Algorithms, Simulation and Experimental Results", Oct. 17, 2003, pp. 1-22.

* cited by examiner

*Primary Examiner*—Yuwen Pan
*Assistant Examiner*—Ajibola Akinyemi
(74) *Attorney, Agent, or Firm*—Harness, Dickey & Pierce

(57) ABSTRACT

In the method of scheduling, an order in which mobile stations are scheduled is changed based on at least one transmit beam criteria.

8 Claims, 4 Drawing Sheets

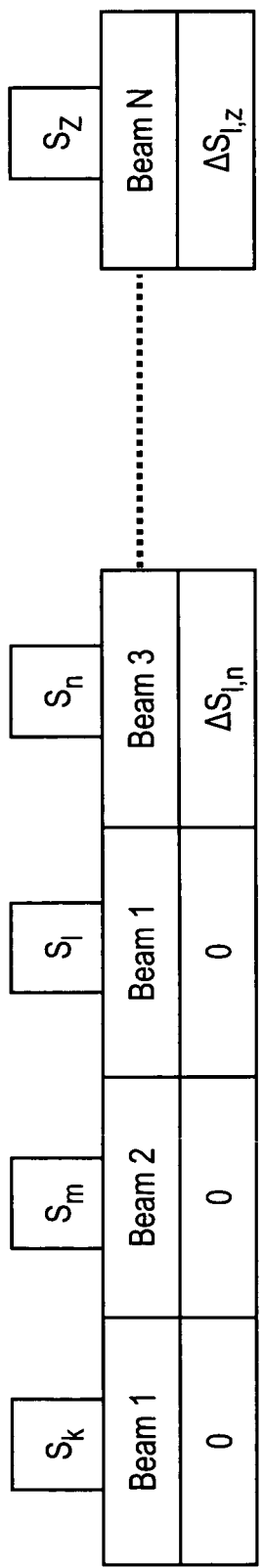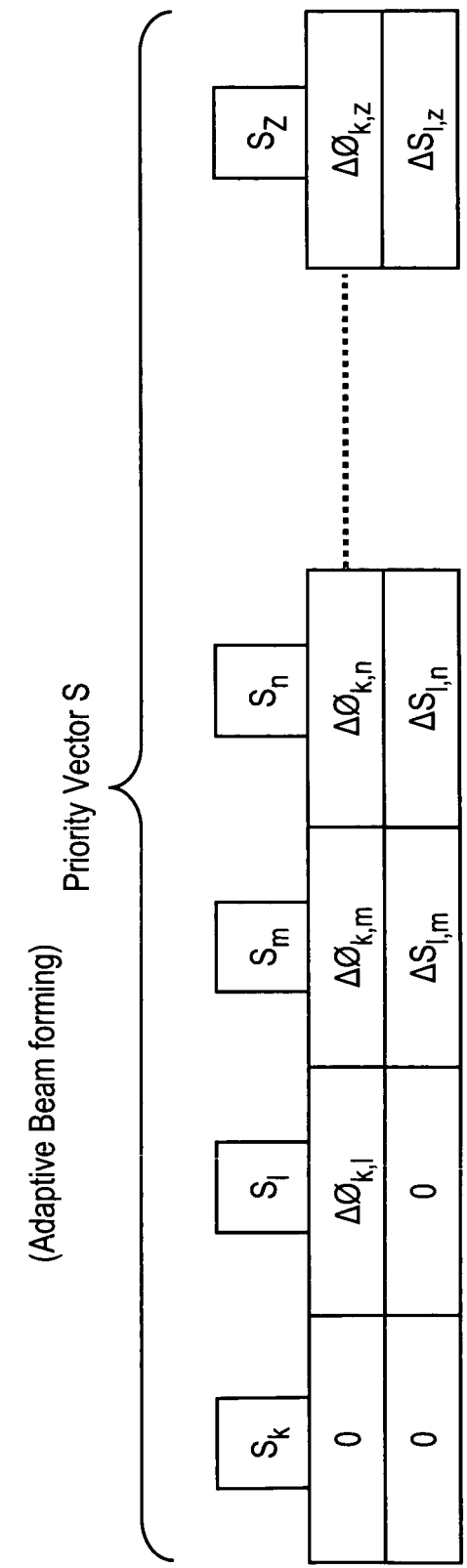

METHOD OF SCHEDULING FOR MOBILE STATIONS IN WIRELESS COMMUNICATION NETWORKS

BACKGROUND OF THE INVENTION

1. Field of the Invention

The present invention relates to scheduling methods in wireless communication networks.

2. Description of the Related Art

Presently, base stations implement scheduling algorithms to schedule transmission by mobile subscribers separately and independently of the beam forming approach, which may also be implemented by the base station. First, scheduling of mobile stations for transmission will be discussed and then different beam forming concepts will be discussed.

A base station typically includes a scheduler implementing a scheduling algorithm that establishes an order in which to schedule the mobile stations for transmission. For example, it is known for the scheduler to establish a priority vector S, an example of which is shown below in Equation 1.

$$S=[S_k, S_l \ldots S_z]] \tag{1}$$

where Si is a service metric value for mobile station i.

The priority vector S is a sorted list of service metric values for the mobile stations to be scheduled, with each value being associated with one of the mobile stations. For example, the service metric value may represent the data history of the mobile user, a channel state, user priority based on a subscribed quality of service, etc. The scheduler sorts the values; for example, from lowest to highest, to establish a scheduling priority for the mobile stations. The mobile associated with the lowest service metric value corresponds to the highest priority mobile station and will be scheduled first. As shown in Equation 1, $S_k$ corresponds to the lowest service metric value, and therefore, mobile station k will be scheduled first.

The scheduler of a base station may apply various scheduling algorithms in determining the service metric value for each mobile station; for example, an algorithm to generate a service metric value may combine one or more measurement values to derive a service metric value. Also, scheduling algorithms may sort or order the scheduling priority of the mobile stations in various ways. For example, these scheduling algorithms may include a round robin scheduling algorithm, a proportional fair scheduling algorithms, as well as other well-known scheduling algorithms.

The quality of service the base station provides to a mobile station may be affected by the scheduling algorithm as will be appreciated from the above description, but may also be affected by the beam forming approach adopted by the base station. Typically, a base station employs one of two types of beam forming: fixed beam forming and adaptive beam forming. In fixed beam forming, the base station uses a number of preformed antenna beams to cover the area of cell. Each mobile station is assigned to one of the preformed beams. FIG. 1 illustrates a base station 10 having four antenna elements in a uniform linear array to form four transmit beams in a sector of the cell serviced by the base station 10. A base station using fixed beam forming may suffer from performance degradation due to interference when a plurality of scheduled mobile stations are assigned to a same one of the beams.

In adaptive beam forming, the base station provides a individual transmit beam for each mobile station; namely, as many beams as mobile stations are formed. This approach provides gains, such as in signal-to-noise ratio and therefore throughput, when the mobile stations are separated by a certain angular distance. However, scheduled mobile stations may suffer from performance degradation due to interference when this angular distance is less than a threshold angle.

Unfortunately, existing scheduling algorithms do not account for the detrimental impact interference may have as a result of the beam forming approach implemented at the base station.

SUMMARY OF THE INVENTION

In the method of scheduling according to the present invention, an order in which mobile stations are scheduled is changed based on at least one transmit beam criteria. The transmit beam criteria is established to reduce interference that may result because of the beam assignments for the scheduled mobile stations.

For example, when fixed beam scheduling is used, the transmit beam criteria may be balanced beam assignment of scheduled mobile stations. As another example, when adaptive beam schedule is used, the transmit beam criteria may be attempting to meet a desired angular difference criteria between a later scheduled mobile station and at least one earlier scheduled mobile station. The desired angular difference criteria may be that an angular difference between the later scheduled mobile station and the at least one earlier scheduled mobile station is greater than a threshold angular difference.

In one embodiment, changing the order in which mobile stations are scheduled is also based on a service metric criteria. As explained, the original schedule of mobile stations is generated based on a service metric for each mobile station. The service metric criteria may be that a difference in service metrics between a mobile station changing to a higher priority position and a mobile station originally holding the higher priority position are below a threshold value.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 4 illustrates the priority vector S of FIG. 3 after a priority adjustment.

FIG. 5 illustrates the priority vector S generated according to any well-known scheduling algorithm such as discussed in the Background of the Invention section as well as an angular difference and a service metric value difference.

DETAILED DESCRIPTION OF THE INVENTION

The present invention provides methods of scheduling mobile station transmission that account for the beam forming approach adopted by the base station. First, embodiments of the scheduling method for base stations adopting the fixed beam forming approach will be described. Then, embodiments of the scheduling method for base stations adopting the adaptive beam forming approach will be described.

Fixed Beam Forming Scheduling Methods

Figure 2:
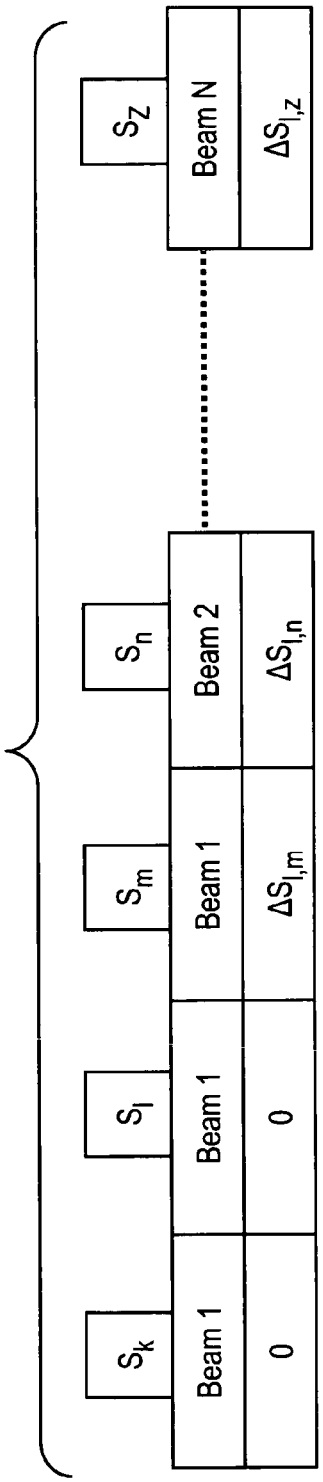
FIG. 2 illustrates the priority vector S generated according to any well-known scheduling algorithm such as discussed in the Background of the Invention section as well as the beam assigned to each scheduled mobile station and a service metric value difference.

FIG. 2 illustrates the priority vector S generated according to any well-known scheduling algorithm such as discussed in the Background of the Invention section, and illustrates the beam assignment for each scheduled mobile station. The methodologies by which the base station may determine the beam assignment for each mobile station are well-known and will not be described in detail for the sake of brevity.

Also, FIG. 2 shows a service metric value difference for each scheduled mobile station with respect to the second scheduled mobile station l. In FIG. 2, mobile station l is the mobile station scheduled after the anchor mobile station. An anchor mobile station is a mobile station whose position in the scheduling order may not be changed. Initially, the first mobile station is the anchor mobile station. Accordingly, in FIG. 2 the anchor mobile station is mobile station k.

As shown in FIG. 2, $\Delta S_{l,m}$ is used to represent the service metric difference between service metric values $S_l$ and $S_m$ (i.e. $S_l$ being subtracted from $S_m$) for the second scheduled mobile station l and the third scheduled mobile station m. Similarly, $\Delta S_{l,n}$ is used to represent the difference between service metric values $S_l$ and $S_n$ for the second scheduled mobile station l and the fourth scheduled mobile station n, and so on.

In an exemplary embodiment of the present invention, a scheduler at the base station may change the order in which mobile stations are scheduled based in part on at least one transmit beam criteria and a service metric criteria. As a non-limiting example, the service metric criteria may be that a difference in service metrics between a mobile station changing to a higher priority position and a mobile station originally holding the higher priority position are below a threshold value. To meet this service metric criteria, a vector window $\Delta W$ is established according to empirical study by the system designer. The mobile stations scheduled after the anchor mobile station, and having an associated service metric value difference less than the vector window $\Delta W$ threshold value, form the set of mobile stations under consideration. Only mobile stations within this set may have their positions changed based on the transmit beam criteria. Furthermore, the vector window threshold value may be adjustable by a system operator during operation of the scheduling method.

Figure 3:
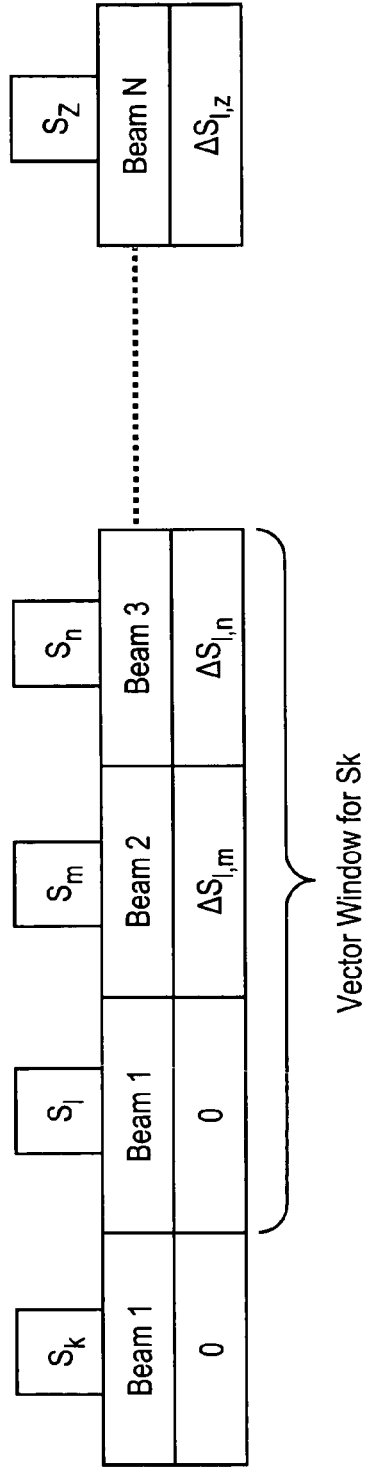
FIG. 3 illustrates the priority vector S of FIG. 2 wherein the vector window of the anchor mobile station has been evaluated.

FIG. 3 illustrates the priority vector S of FIG. 2 wherein the vector window $\Delta W$ of anchor mobile station k has been evaluated. As shown, the vector window includes mobile stations l, m and n having service metric values $S_l$, $S_m$, and $S_n$ and beam assignments beam 1, beam 1 and beam 2, respectively. Namely, the service metric differences $\Delta S_{l,l}$, $\Delta S_{l,m}$, and $\Delta S_{l,n}$ for mobile stations l, m and n, respectively, fall below the threshold value of the vector window $\Delta W$.

As mentioned above, the scheduler may determine whether a change in scheduling order is desired based on whether the beam assignments of the mobile stations in the set under consideration meet at least one transmit beam criteria. In one embodiment, the transmit beam criteria is beam balanced scheduling of the mobile stations. For example, assume five mobile stations in the set under consideration, with a total of three beams 1, 2 and 3, an anchor mobile station assigned to beam 3, and a current scheduling of these mobile stations such that the beam assignments are beam 1, beam 1, beam 2, beam 2 and beam 3. This schedule represents an unbalanced beam scheduling of the mobile stations on the transmit beams. By contrast, a schedule such that the beam assignments are beam 1, beam 2, beam 3, beam 2, and beam 1 may provide a balanced beam scheduling of the mobile stations on the transmit beams.

The transmit beam criteria is established to detect schedules that may produce undesirable interference conditions. Accordingly, in order to reduce interference, the transmit beam criteria in the set under consideration is improved by changing the scheduling order of the mobile stations in the set under consideration. As will be appreciated, the above discussion provides only one example of the many possible service metric criteria and transmit beam criteria that a system designer may establish, and the present invention should not be construed as limited to these examples.

As discussed above, and more generally stated, the mobile station scheduled a position before the first mobile station scheduled in the set under consideration is the anchor mobile station. The position of the anchor mobile station in the scheduling order may not be changed. The scheduler may, however, determine whether a change in scheduling order of mobile stations in the set under consideration may be made to improve the transmit beam criteria.

Starting from the first scheduled mobile station in the set under consideration, the scheduler determines if the transmit beam criteria has been met. Using the set shown in FIG. 3 and assuming the transmit beam criteria is beam balanced scheduling of the mobile stations in the set, the scheduler may determine the number of mobile stations currently permanently scheduled on beams 1, 2 and 3 in the priority vector S. Initially, since only the anchor mobile station k has been permanently scheduled, the number of mobile stations permanently scheduled on beam 1 is "1", the number of mobile stations scheduled on beam 2 is "0" and the number of mobile stations scheduled on beam 2 is "0"—hereinafter represented by [1,0,0]. Since the anchor mobile station k is assigned to beam 1, giving beam 1 the highest load value of current beam scheduling, the scheduler determines whether a mobile station exists within the vector window, illustrated in FIG. 3, which is assigned to a beam with the lowest load. Since the beam scheduling is currently [1,0,0] both beam 2 and beam 3 have zero mobile stations currently assigned to the set, and therefore beams 2 and 3 have the lowest load. Therefore, a mobile station assigned to either beam 2 or beam 3 should be set to the position following the anchor mobile station k.

In an exemplary embodiment of the present invention, the first scheduled mobile station assigned to a beam with a lowest load in the vector window may be set to the position following the anchor mobile station—hereinafter referred to as a priority adjustment. In the event that no scheduled mobile station in the vector window is assigned to a beam with the lowest load, a first scheduled mobile station assigned to a beam with the next lowest load in the vector window may be set to the position following the anchor mobile station, and so on.

As illustrated in FIG. 3, mobile stations m and n in the set under consideration are assigned to beams 2 and 3, respectively. Because mobile station m has the lower service metric difference (i.e. mobile station m is scheduled earlier than mobile station n in the vector window), the scheduler changes the scheduling order so that mobile station m is scheduled for transmission after mobile station k (i.e., a priority adjustment).

FIG. 4 illustrates the priority vector S of FIG. 3 after this priority adjustment. The scheduler now assigns mobile station m as the anchor mobile station, and a new vector window is determined for the anchor mobile station m. The beam scheduling is now [1,1,0], as there is one mobile station assigned to each of beams 1 and 2 in the permanent portion of the scheduling order.

Since the beam scheduling is now [1,1,0], beam 3 is now the beam with the lowest scheduling load. The scheduler may determine whether a mobile station assigned to beam 3 exists in the vector window for anchor mobile station m. In accordance with the above-described method, the scheduler may make a priority adjustment to assign a mobile station assigned to beam 3 as the next anchor mobile station to follow the anchor mobile station m in the permanent scheduling order, making the beam scheduling [1,1,1].

The above described process is repeated for a length of the vector S, the length being determined by the system designer. The scheduler will continue shifting to the next scheduled mobile station as the anchor mobile station, which continues shifting the vector window.

Furthermore, it will be appreciated that when an anchor mobile station is reached with a beam scheduling of [1,1,1], [2,2,2] or any other beam scheduling in which each of the beams has an equal number of permanently assigned mobile stations, the scheduler may operate as if the beam scheduling was [0,0,0]. In this embodiment, the mobile station scheduled after the anchor mobile station may be assigned as the next anchor mobile station, irrespective of its beam assignment.

Furthermore, if mobile station 1 had been assigned to beams 2 or 3 in the example of FIG. 3, then the scheduler would have maintained the position of mobile station 1. Next, the scheduler would have made mobile station 1 the anchor mobile station, and the process of determining the set under consideration, etc. would have been repeated with respect to anchor mobile station 1.

Adaptive Beam Forming Scheduling Methods

FIG. 5 illustrates the priority vector S generated according to any well-known scheduling algorithm such as discussed in the Background of the Invention section. Furthermore, FIG. 5 illustrates service metric differences determined in the same manner as discussed above with respect to the embodiment illustrated in FIG. 2. Namely, the anchor mobile station is initially set as the first scheduled mobile station, mobile station k, and the service metric differences are determined with respect to the next scheduled mobile station, mobile station l.

Figure 1:
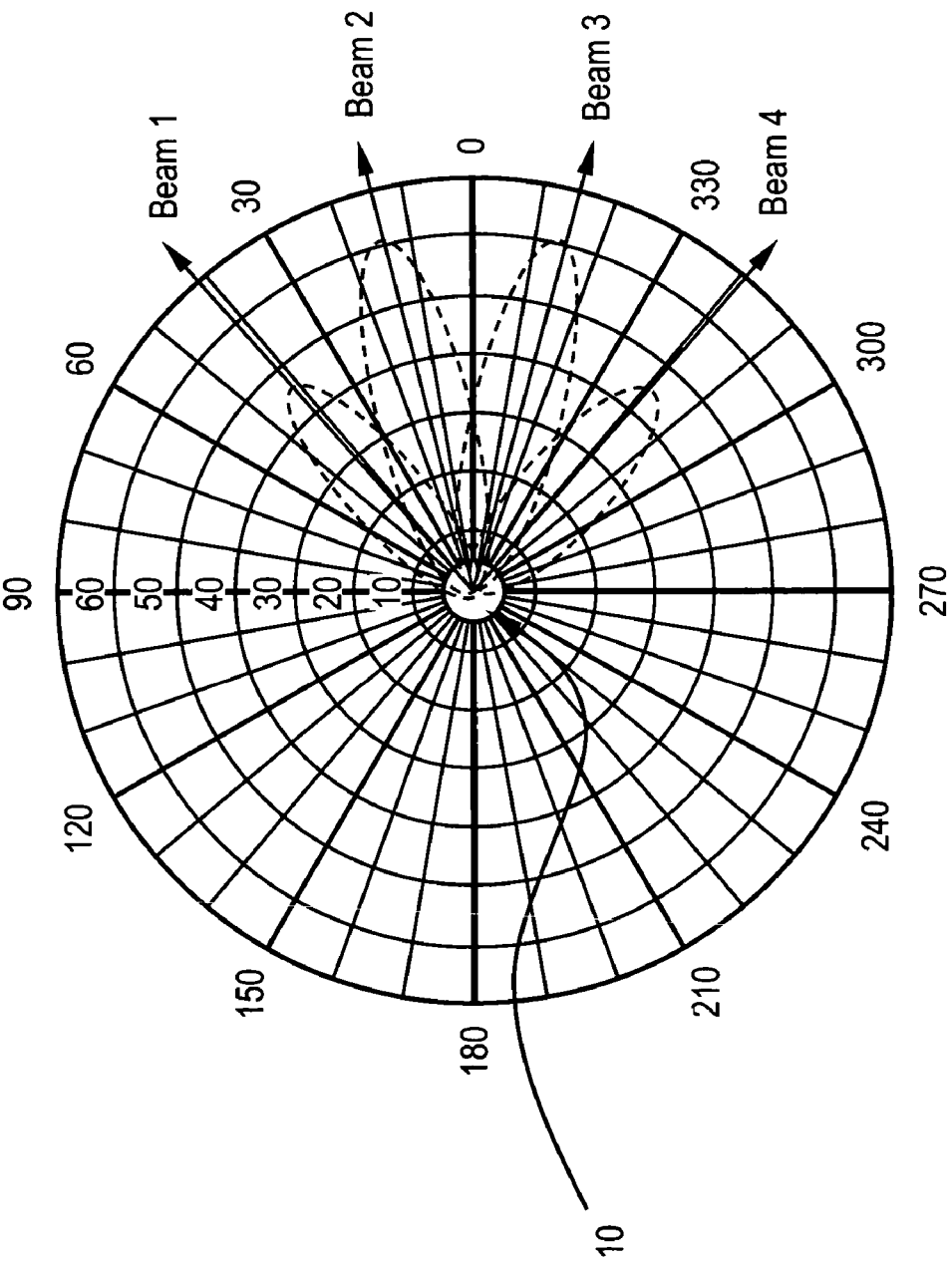
FIG. 1 illustrates a base station having four antenna elements in a uniform linear array to form four beams in a sector of the cell serviced by the base station.

In this embodiment, each mobile station is assigned a beam according to any well-known adaptive beam forming methodology such as discussed in the Background of the Invention section. Each assigned beam is considered to radiate from the base station along an associated vector. FIG. 1 illustrates and example of this. Accordingly, an angular difference between two vectors may be determined for each possible pair of mobile stations. In this embodiment, this angular difference is referred to as the angular difference between the mobile stations. FIG. 5 shows the angular difference between each mobile station within the priority vector S and the anchor mobile station. As shown, $\Delta\emptyset_{k,l}$ is used to represent the angular difference between mobile stations k and l. Similarly, $\Delta\emptyset_{k,m}$ is used to represent the angular difference between mobile stations k and m, and so on. The methodologies by which the base station determines the angular difference between mobile stations are well-known and will not be described in detail for the sake of brevity.

In an exemplary embodiment of the present invention, a scheduler at the base station may change the order in which mobile stations are scheduled based in part on at least one transmit beam criteria and a service metric criteria. As a non-limiting example, the service metric criteria may be the same as discussed above with respect to the embodiment of FIGS. 2-4; namely, that a difference in service metrics between a mobile station changing to a higher priority position and a mobile station originally holding the higher priority position are below a threshold value. To meet this service metric criteria, a vector window $\Delta W$ is established according to empirical study by the system designer. The mobile stations scheduled after the anchor mobile station, and having an associated service metric value difference less than the vector window $\Delta W$ threshold value, form the set of mobile stations under consideration. Only mobile stations within this set may have their positions changed based on the transmit beam criteria. Furthermore, the vector window threshold value may be adjustable by a system operator during operation of the scheduling method.

Figure 6:
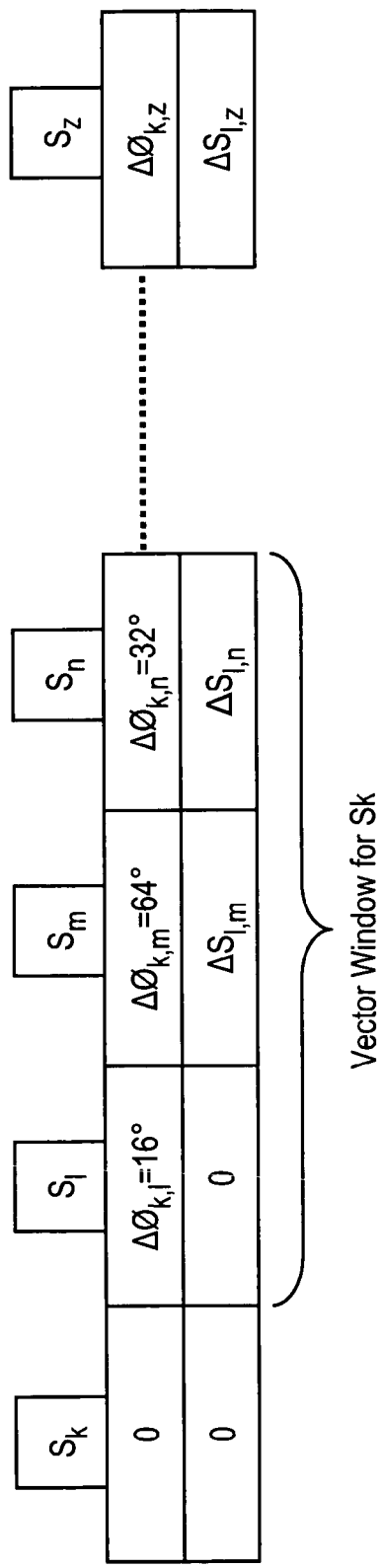
FIG. 6 illustrates the priority vector S of FIG. 5 wherein the vector window of the anchor mobile station has been evaluated.

FIG. 6 illustrates the priority vector S of FIG. 5 wherein the vector window $\Delta W$ of anchor mobile station k has been evaluated. As shown, the vector window includes mobile stations l, m and n having service metric values $S_l$, $S_m$, and $S_n$ and angular differences $\Delta\emptyset_{k,l}$, $\Delta\emptyset_{k,m}$ and $\Delta\emptyset_{k,n}$, respectively. As discussed in more detail below, the angular differences are determined somewhat differently when the anchor mobile station is not the first scheduled mobile station.

As mentioned above, the scheduler may determine whether a change in scheduling order is desired based on whether the angular differences of the mobile stations in the set under consideration meet a transmit beam criteria. In one embodiment, the transmit beam criteria is that the mobile station scheduled one position after the anchor mobile station has angular differences with the anchor mobile station and the mobile stations scheduled before the anchor mobile station greater than a threshold angle. The transmit beam criteria is established to detect schedules that may produce undesirable interference conditions. Accordingly, in order to reduce interference, the transmit beam criteria in the set under consideration is improved by changing the scheduling order of the mobile stations in the set under consideration.

As will be appreciated, the above examples provide limited examples of the many possible service metric and transmit beam criteria that a system designer may establish, and the present invention should not be construed as limited to these examples.

Returning to the example of FIG. 6, and assuming for purposes of example only that the threshold angle is assumed to be 30°, the first scheduled mobile station in the set under consider following the anchor mobile station k having an angular difference with mobile station k which is greater than the threshold angle 30° is mobile station m, wherein $\Delta\emptyset_{k,m}$=64°. Accordingly, the scheduler changes the scheduling position of mobile station m to follow anchor mobile station k. The scheduling position of mobile station l is now one position after its initial scheduling position. This adjustment to the scheduling order in response to the transmit beam criteria is referred to as a priority adjustment.

Figure 7:
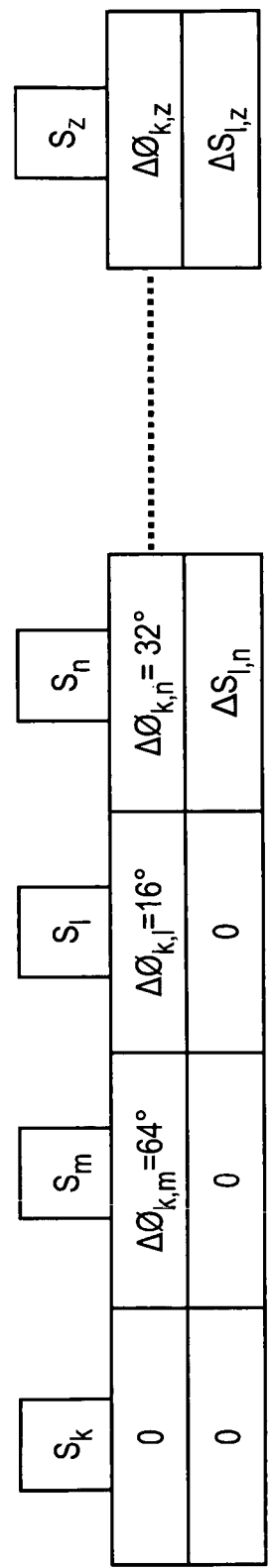
FIG. 7 illustrates the resultant priority vector S after a priority adjustment.

FIG. 7 illustrates the resultant priority vector S after the priority adjustment. As shown, mobile station m is positioned after mobile station k, which causes all mobile stations scheduled between mobile station m and anchor mobile station k, before the priority adjustment, to be scheduled one position after their initial scheduling positions in the priority vector S. The priority vector S is now S=[$S_k$, $S_m$, $S_l$, $S_n$, . . . $S_z$].

As another example, if there is no mobile station within the vector window with an angular difference greater than the threshold angle, the scheduler should select the mobile station in the vector window with the largest angular difference to follow the anchor mobile station after the priority adjustment.

Having completed this operation for the first mobile station, the scheduler may move to the next mobile station, now mobile station m, as the anchor mobile station and repeat the operation described above. However, the determination of the angular difference for anchor mobile stations other than the first anchor mobile station differs. For each mobile station subsequent to the anchor mobile station, the scheduler determines the angular difference between that mobile station and each anchor mobile station. Then, the minimum angular difference is selected as the angular difference for the mobile station.

For example, if the anchor mobile station is m, then the angular difference for a mobile station p scheduled after anchor mobile station n may be described as $\Delta\varnothing_{k-m,p}$, where $\Delta\varnothing_{k-m,p}$ is the minimum angular difference of the angular differences between mobile station p and mobile stations k through anchor mobile station m.

The above described process for determining priority adjustments is then repeated using the determined angular differences. For example, assume priority vector S is $S=[S_k, S_l, S_m, S_n, S_o, S_p \ldots S_z]$, that the current anchor mobile station is m, that mobile stations n, o and p are within the vector window for mobile station m, that the threshold angle is 30°, and the angular differences are $\Delta\varnothing_{k-m,n}=14°$, $\Delta\varnothing_{k-m,o}=28°$, and $\Delta\varnothing_{k-m,p}=78°$. Because mobile station p is the first mobile station in the set under consideration meeting the transmit beam criteria, a priority adjustment is made to position mobile station p after mobile station m.

The scheduler will continue shifting to the next scheduled mobile station as the anchor mobile station, which continues shifting the vector window.

The exemplary embodiments of the present invention being thus described, it will be obvious that the same may be varied in many ways. For example, the present invention is not limited to the examples (e.g., number of beam, transmit criteria, etc.) used in describing the present invention. Such variations are not to be regarded as a departure from the invention, and all such modifications as would be obvious to one skilled in the art are intended to be included within the present invention.

We claim:

1. A method of scheduling transmissions from mobile stations to reduce interference, comprising:

altering a service metric value of at least one mobile station, based on transmit beam criteria, the transmit beam criteria being used to implement a beam forming approach at a base station;

calculating a priority vector for a plurality of mobile stations, using the altered service metric value; and changing an order in which uplink transmissions from mobile stations are scheduled based on the calculated priority vector, wherein the priority vector includes information describing which transmit beams the mobile stations are assigned, wherein the transmit beam criteria is balanced beam assignment of scheduled mobile stations.

2. The method of claim 1, wherein the service metric criteria is that a difference in service metrics between a mobile station changing to a higher priority position and a mobile station originally holding the higher priority position is below a threshold value.

3. The method of claim 2, wherein the threshold value is adjustable.

4. A method of scheduling transmissions from mobile stations to reduce interference, comprising:

altering a service metric value of at least one mobile station, based on transmit beam criteria, the transmit beam criteria being used to implement a beam forming approach at a base station;

calculating a priority vector for a plurality of mobile stations, using the altered service metric value; and changing an order in which uplink transmissions from mobile stations are scheduled based on the calculated priority vector, wherein the priority vector includes information describing which transmit beams the mobile stations are assigned, wherein the transmit beam criteria is to maintain a desired angular difference criteria between a later scheduled mobile station and at least one earlier scheduled mobile station, wherein the desired angular difference criteria is that an angular difference between the later scheduled mobile station and the at least one earlier scheduled mobile station is greater than a threshold angular difference.

5. The method of claim 4, wherein the threshold angular difference is 30 degrees.

6. The method of claim 4, wherein the transmit beam criteria is to maintain a desired angular difference criteria between the later scheduled mobile station and each earlier scheduled mobile station.

7. The method of claim 4, wherein the service metric criteria is that a difference in service metrics between a mobile station changing to a higher priority position and a mobile station originally holding the higher priority position is below a threshold value.

8. The method of claim 7, wherein the threshold value is adjustable.

* * * * *